United States Patent [19]

Karning et al.

[11] Patent Number: 4,601,540

[45] Date of Patent: Jul. 22, 1986

[54] METHOD AND APPARATUS FOR THE TURNING ON AND OFF OF A SIGNAL IN OPTICAL OR OPTRONIC DEVICES

[75] Inventors: Heinrich Karning; Gerhard Raubinger, both of Heidelberg; Wolfgang Weigel, Dossenheim, all of Fed. Rep. of Germany

[73] Assignee: Eltro GmbH, Heidelberg, Fed. Rep. of Germany

[21] Appl. No.: 509,178

[22] Filed: Jun. 29, 1983

[30] Foreign Application Priority Data

Jul. 5, 1982 [DE] Fed. Rep. of Germany ....... 3225022

[51] Int. Cl.⁴ .................. G02B 26/02; G02B 26/08
[52] U.S. Cl. ................................. 350/266; 350/487; 350/269
[58] Field of Search ............. 350/266, 487, 587, 269, 350/579, 580, 581; 354/266, 203, 121

[56] References Cited

U.S. PATENT DOCUMENTS

| 3,594,062 | 7/1971 | Disley | 350/579 |
| 3,669,523 | 6/1972 | Edwards | 350/579 |

FOREIGN PATENT DOCUMENTS

| 0043133 | 6/1981 | European Pat. Off. | |
| 2040445 | 3/1972 | Fed. Rep. of Germany | |
| 2006075 | 12/1969 | France | |
| 488165 | 5/1970 | Switzerland | |
| 892008 | 3/1962 | United Kingdom | 350/587 |

Primary Examiner—John K. Corbin
Assistant Examiner—P. Dzierzynski
Attorney, Agent, or Firm—Handal & Morofsky

[57] ABSTRACT

A method and apparatus for changing the operational state of an optical or optoelectronic sighting device from the READY state to an operational state and vice versa, wherein the change in the state of the device is effected automatically, thereby freeing the user's hands for use in other immediate tasks. The apparatus comprises an eyepiece, a deformable eye rest, shutter means formed integrally therewith, transmitter means, receiver means, reflecting means fixed to the shutter means, and switch means. In the READY state, only those parts of the apparatus which require a relatively longer start-up time are energized. Also, in the READY state, a beam is transmitted from the transmitter means to the reflecting means and then back to the receiver means. When the user presses his head against the deformable eye rest, the eye rest deforms and the shutter means opens, uncovering the sight channel formed by the eyepiece and the eye rest. Also, the optical path of the transmitted beam is interrupted. The switch means opens in response to this interruption, thereby fully energizing the apparatus and transferring it from the READY state to its operational state. When the head of the user is removed, the shutter means are restored to the closed position and the apparatus is switched back to the READY state.

14 Claims, 5 Drawing Figures

FIG. I.

METHOD AND APPARATUS FOR THE TURNING ON AND OFF OF A SIGNAL IN OPTICAL OR OPTRONIC DEVICES

BACKGROUND ART

The present invention relates to a method and apparatus for the turning on and off of a signal in optical or optronic or opto-electronic devices, which comprise a lens or magnifying optics, an eyepiece having an eye rest, as well as a current supply which can be turned on and off by the simple application of a user's function.

A similar device is known, for example, from German Utility Model No. DBGM610529 in which the current supply of an infrared sighting device secured on a head band can be turned on by hand and, by the simple removal thereof from the head, it can be turned off again. This device has a disadvantage in that the switch itself is placed in an anthropotechnically undesirable place and, in addition, for the turning-on process, a hand operation is required, so that the hand for that instant will not be available for other operating functions. This can be considered a substantial disadvantage, especially in connection with defense-oriented technical devices, in which several measures are frequently and simultaneously necessary, such as observation and/or targeting as well as shooting preparation. Similar disadvantages are associated also with the infrared sighting device disclosed in German Utility Model No. DBGM1901557. The switch of this apparatus is constructed in such a manner that it is kept in a turned-off position through a spring action when the infrared device is not in use.

There also is known a further category of optical or opto-electronic devices, in which two operating functions are available: in one of the operating functions, i.e., the READY function, only those functional parts of the apparatus are supplied with current which require a longer start-up time. Thus, they must be kept in operation, available for quick action. In this category one may include, for example, the cooling arrangements and tube pre-heating arrangements. In the other operating function of such devices, i.e., the IN function, the entire apparatus becomes supplied by current. Only then will an apparatus of this type become operational. Both operating functions are usually set by means of a combined switch which can be alternately moved from the READY to the IN position. Notwithstanding the above-mentioned disadvantages associated with one hand being occupied in performing operational functions, there is the additional danger that in the event that the operator forgets to return the switch to the READY position, it may lead to draining the battery.

SUMMARY OF THE INVENTION

It is an object of the present invention to provide an apparatus of the above-mentioned type, in which, concurrently with its use or non-use, the turning on or turning off of an operating state thereof is possible.

It is another object of the present invention to provide a method of turning on or off an electrical signal in an optical or opto-electronic device, effecting its different operating states by pressing the head of the user against an eye rest of the apparatus or removing the pressure by the head therefrom.

These and other objects are achieved according to the present invention in the following manner. The user presses his head against an eye rest of the apparatus and as a result, a sight channel, which is otherwise closed by a shutter, will be opened. As a result of the shutter operation, a switch will be moved from the READY position into the IN position. By moving the head away from the eye rest, the switch will be returned to the READY position. As a result, the invention frees the user from the task of performing any additional operating functions. Therefore, he can completely concentrate on performing the immediate operating functions of the device and on other important measures. In addition, at the same time, the battery is safe from being exhausted because the switch is maintained in the READY position.

According to the nature of the device to be used, for the in/out switch one may use a mechanically or magnetically operated switch or a light switch comprising a transmitter and a receiver, according to which the receiver may be in the form of phototransistors, photoelements, or photo-resistors, and the transmitter may be in the form of incandescent lamps, fluorescent screens, or, for example, a light-emitting diode (LED) coming from a heat picture device having a long dash or pulsating or coded pulsed radiation. The LED's for the above-noted application can be in the form of the indicator of a series-connected laser distance-measuring arrangement or similar device, which indicator is incorporated into the eyepiece.

The use of modulated LEDs here can offer an advantage in that one could achieve a total insensitivity against disturbing outer light interference.

A further aspect of the present invention provides that the shutter flaps, which in the READY position cover the sight channel, upon the application of pressure to the eye rest by the head of the user, uncover the sight channel (which corresponds to the IN position). The shutter flaps are formed on the eye rest and rotate outwardly as pressure is applied. A transmitter and a receiver are arranged in front of the lens optical arrangement, in the direction of beam entry. In the covered state of the sight channel the transmitter beam is reflected onto the receiver from the shutter side which is remote from the eye of the user, while in the uncovered state of the sight channel, the optical path between transmitter and receiver is interrupted. In the latter case the switch is thrown from its READY position to its IN position. An apparatus of this type is easy and pleasant to use because it frees the operator from all unnecessary operating functions.

Furthermore, it is advantageous if the shutter comprises one or more protecting flaps which can tilt outwardly upon material deformation of the eye rest as the pressure of the user's head is applied. In the latter case, the protecting flaps of the shutter are formed on the eye rest on confronting sides thereof and, when not in the closed position, they extend along the longitudinal axis of the eyepiece. In connection with this, it is preferred that the eye rest and the protecting flaps be made from a flexible material, for example, from rubber or synthetic material, and that on the backside of the flaps, i.e., the side remote from the user, there is provided a reflex foil.

According to the provisions of the present invention, the arrangement of the transmitter and the receiver can take various forms. For example, the arrangement may be such that the transmitted and received beam enters and leaves the lens optics of the eyepiece directly or through optical means, in which case the optical means may comprise an additional optical arrangement, a ray- or beam-splitting plate, a prism combination, a beam-splitting cube, or a combination of a beam-splitting cube and a target-marking projector. The transmitter and the receiver are arranged in a peripheral region of the lens optics. In the case where an additional optical arrangement or a prism combination is used, they can be arranged parallel to each other, whereas in the case where a beam-splitting plate or a beam-splitting cube is used, they may be arranged or offset 90° with respect to each other. In the case where the combination of a beam-splitting cube and a target-marking projector is used, the transmitter and receiver are arranged in the target-marking plane. The application of a beam-splitting cube, a beam-splitting plate, or a prism combination or of a target-marking projector appears to have a certain advantage with respect to the additional optics in that the signal which has been transmitted exactly on the same path and again reflected, can be received in a more reliable fashion.

A further preferred feature of the present invention provides that on the sides of the beam-splitter cube and of the prism combination which do not take part in the beam reflection or beam entry or exit, there is provided an absorber which eliminates the danger of cross-talk.

BRIEF DESCRIPTION OF THE DRAWINGS

The present invention will become more readily apparent from the following description of the preferred embodiments thereof and the method for practicing the invention, shown and described in connection with the accompanying drawings, in which.

DESCRIPTION OF THE PREFERRED EMBODIMENT

Figure 1:
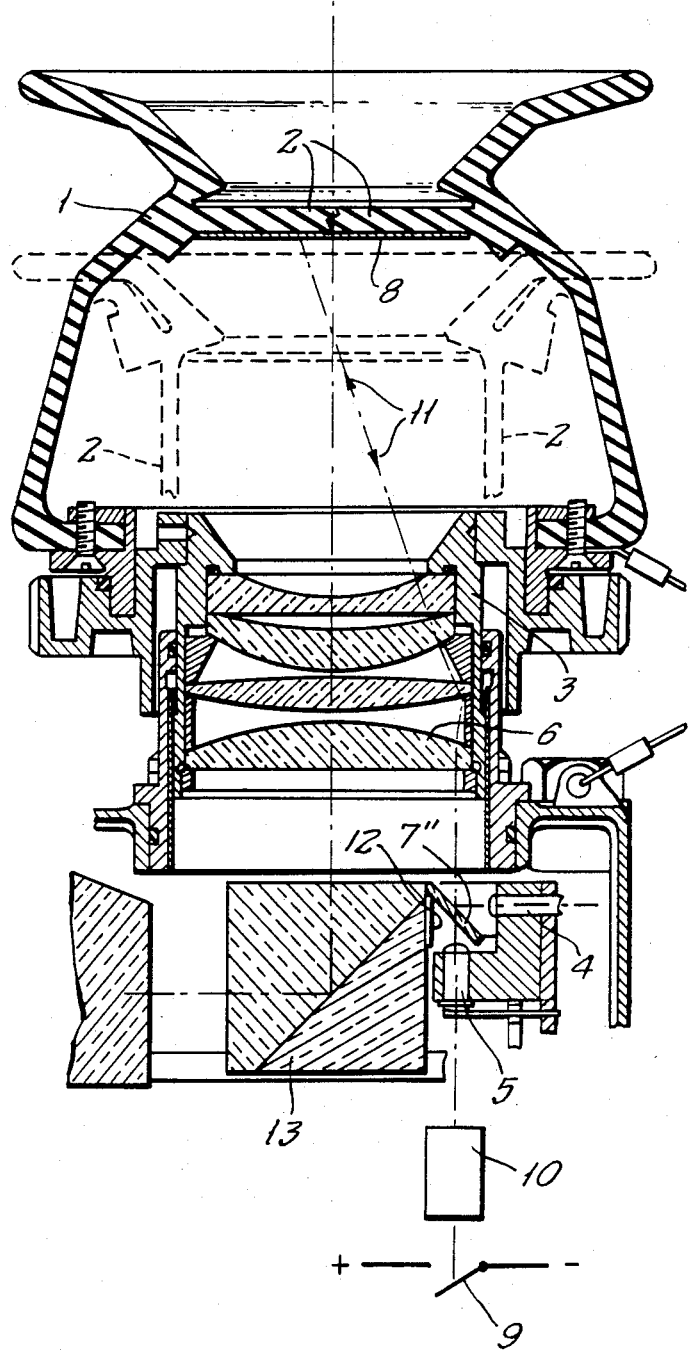
FIG. 1 illustrates in a cross-sectional schematic view the apparatus according to the present invention, including a transmitter, a receiver, and an associated beam-splitting plate.

With reference to FIG. 1, it is seen that the user of, for example, a targeting device will press his head, for purposes of observation or targeting, against the eye rest 1 made from rubber or synthetic material. By deforming the eye rest as a result of the head's pressure, the eye rest will be moved from the position indicated by the solid lines into a position indicated by the dotted lines. The shutter 2, which is formed on the eye rest on its inner side, includes in the illustrated embodiment a pair of protecting flaps made from the same rubber or synthetic material. In the non-actuated position, the flaps contact in the region of the longitudinal axis of the apparatus. When the operator's head is pressed against the eye rest, the shutter flaps rotate outwardly, away from the longitudinal axis, by about 90°, thereby uncovering the sight channel for the eye of the user. In other embodiments (not illustrated) the shutter 2 can be made of a single or more than two protecting flaps, which can be rotated outwardly by an angle smaller or larger than 90°. With this operating function an optronic or opto-electronic switch is coupled, which includes a light barrier or switch and is arranged and operated as described below.

The above-described embodiment comprises four lenses which make up the optical arrangement 6 of the eyepiece 3. In the peripheral region of the apparatus a transmitter 4 and a receiver 5 are arranged, offset by 90° with respect to each other. The transmitter may comprise, for example, a light-emitting diode, and the receiver comprises a photo-diode. In other embodiments the transmitter can just as well comprise an incandescent lamp or a fluorescent screen, and the receiver can comprise a photoelement or a photo-resistor. The beam-splitting cube 13 will reflect or mirror the target mark into the apparatus.

The visible or infrared beam transmitted by the transmitter will impinge on the beam-splitter plate 7" which deflects the beam by 90°. Then the beam passes through optical arrangement 6 and impinges on the backside of the closed shutter 2. On the backside of the shutter lying remote from the user, a reflex foil 8 is provided, the structure 8' of which is detailed in FIG. 2. As shown by the double arrow 11, the beam is reflected by foil 8 onto the beam-splitter plate 7". The beam passes through plate 7" and arrives at the receiver 5. The simplest form of such a beam-splitter plate is a glass or synthetic plate. The transmitter beam can be either in the form of a long dash or pulsated and also coded signal. The receiver 5 forms the beam in an opto-electronic manner into an electrical signal. As long as this signal is present, the optical circuit remains closed. This means that the eye rest 1 is not being actuated by a user, that is, the apparatus is in the operating state READY, in which only those apparatus portions which require a longer start-up time are energized. On the other hand, if the eye rest is actuated, the protecting flaps of the shutter 2 will rotate outwardly in the above-described manner, and the optical path between the transmitter 4 and the receiver 5 will be interrupted, that is, the receiver signal will be greatly reduced.

As a result of the reduction of the receiver signal, a logic device 10, serially coupled to the receiver 5, will operate a switch 9 which will change the operating state of the apparatus from READY to IN. In the latter operating state the entire apparatus will be energized. By means of an appropriate delay circuit in the logic device 10, the apparatus may be kept, for a predetermined time period, in this operating state. It is also possible that the turningon function could be made dependent on preselected criteria.

Upon completion of the use phase (i.e., the targeting or observation process) by the user, the eye rest 1 is released, the flaps of shutter 2 return from their dotted line position to their solid line position (see FIG. 1), and the optical circuit is automatically closed, thereby changing the operating state of the apparatus from IN to READY.

Figure 2:
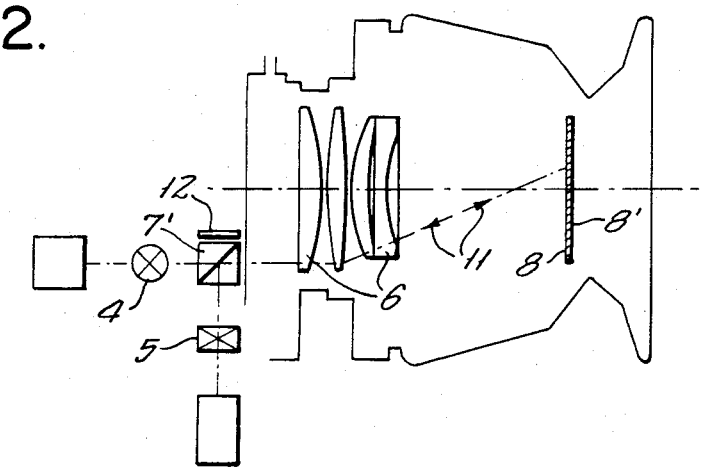
FIG. 2 illustrates the apparatus according to FIG. 1, including a transmitter, a receiver, and an associated beam-splitting cube.

FIG. 2 illustrates a modification of the embodiment of FIG. 1 in which, instead of the beam-splitter plates 7", a beam-splitting cube 7' is used. In this embodiment the transmitter 4 and the receiver 5 are again offset 90° with respect to each other. The beam reflected from the reflex foil 8' inpinges on the beam-splitting cube 7' and is deflected by 90° onto the receiver 5 arranged in this direction. The positions of the transmitter and the receiver may also be interchanged within this embodiment.

Figure 3:
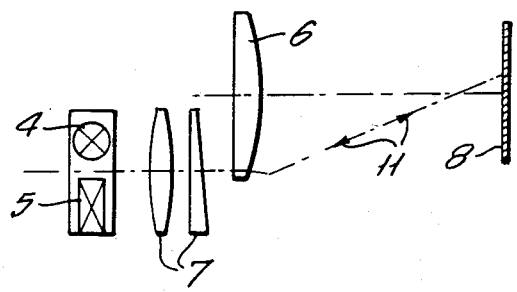
FIG. 3 illustrates the apparatus of FIG. 1, including a transmitter, a receiver, and an optically coupled eyepiece.

In the embodiment of FIG. 3 the transmitter 4 and the receiver 5 are arranged parallel to each other. The beam, indicated by double arrow 11, will pass through an additional optical arrangement 7. Optical arrangement 7 is placed between the transmitter/receiver (4/5) and the optical arrangement 6.

Figure 4:
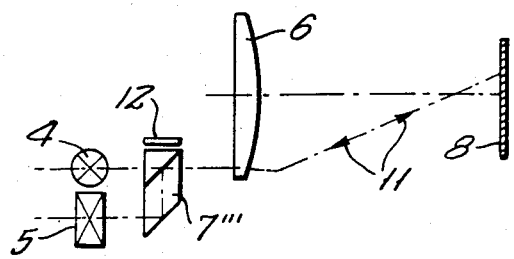
FIG. 4 illustrates the apparatus of FIG. 1, including a transmitter, a receiver, and an associated prism combination.
Figure 5:
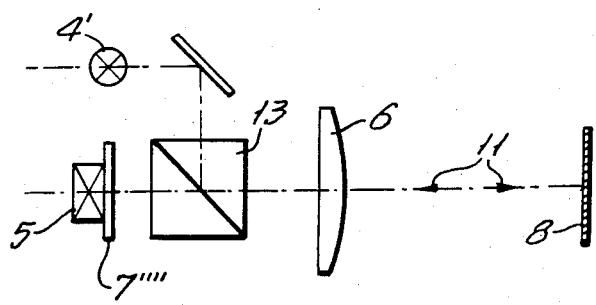
FIG. 5 illustrates a further embodiment of the apparatus of FIG. 1, including a transmitter and a receiver in connection with a combination comprising a beam-splitting cube and a target-marking projector.

Further embodiments of the invention are illustrated in FIGS. 4 and 5. In FIG. 4 a prism combination 7'''comprising a pentaprism and a parallelogram-shaped prism are used. In FIG. 5. a target-marking projector 7'''' of, for example, a heat picture device (not illustrated) is used. These elements are used in place of the beam-splitter cube or plate shown in FIGS. 1 and 2. In both FIGS. 4 and 5, the transmitter and the receiver are arranged in parallel In the embodiment of FIG. 5 it is possible that the lightemitting diodes of the target-marking projector 7'''' (not illustrated in the drawings) are operated in a modulated fashion and that their non-illuminated part could be used as a large surface detector 5. Also, when using a heat picture device, it is possible to make use of the light-emitting diode 4', already present in the apparatus and necessary for the heat picture production, to serve as the transmitter according to the present invention, at least in the type of apparatus in which the pick-up mirror in the turn-off position assumes a mechanical zero position.

The interrupted line between light-emitting diode 4' and the shifting mirror in FIG. 5 indicates that additional optical elements may be arranged between the diode and the mirror. A description of these optical elements is not necessary for understanding the operation of the present invention. The splitting of the transmitted and received beams is performed in FIG. 5 by the beam-splitting cube 13.

The above description of the preferred embodiments is presented for illustrative purposes only and is not intended to limit the scope of the present invention as claimed in the appended claims. It will be understood that modifications and variations may be effected without departing from the scope of the inventive concept herein disclosed.

We claim:
1. An optical apparatus having a plurality of electrical elements, comprising:
   (a) an eye piece housing;
   (b) optics means for performing on optical function contained within said eye piece housing;
   (c) an eye rest disposed on said eye piece housing, said eye piece housing and said eye rest defining a sight channel;
   (d) normally closed shutter means coupled to said eye rest for blocking said sight channel, said shutter means and said eye rest configured to cause said shutter means to open in response to the application of pressure to said eye rest;
   (e) reflex foil means provided on surfaces of said shutter means facing said eye piece housing;
   (f) transmitter means for emitting a control signal along a transmission path;
   (g) receiver means arranged on said transmission path, said path extending from said transmitter means to said reflex foil means to said receiver means, said shutter means being movable upon application of said pressure to said eye rest by the head of a user to open and uncover said sight channel to thereby interrupt the signal transmission path;
   (h) energizing means for supplying energizing current to certain of said electrical elements of said optical apparatus retaining said apparatus in a READY operational state when said shutter means is closed; and
   (i) switch means actuated by interruption of said signal transmission path by opening said shutter means for supplying energizing current to the other electrical elements of said apparatus and for putting said apparatus into an IN operational state.

2. The optical apparatus as claimed in claim 1, wherein said switch means is a mechanical switch.

3. The optical apparatus as claimed in claim 1, wherein said switch means is a magnetically operated switch.

4. The optical apparatus as claimed in claim 1, wherein said switch means is a light barrier formed by said transmitter and receiver means.

5. The optical apparatus as claimed in claim 1, wherein said shutter means is integrally formed with said eye rest and made from a pressure deformable material and comprises at least a pair of flap means adapted to rotate outwardly from the longitudinal axis of said sight channel upon the application of pressure to said eye rest.

6. The optical apparatus as claimed in claim 1 wherein said receiver means is selected from the group consisting of phototransistors, photodiodes, photoresistors, and photoelements, and said transmitter means is selected from the group consisting of fluorescence screens, incandescant lamps, and heat picture devices with light-emitting diodes operating with beams selected from the group consisting of line dash, pulsed and coded-pulse beams.

7. The optical apparatus as claimed in claim 1, wherein said signal passes from said transmitter means and returns to said receiver means through additional optical means prior to entry into and exiting from said optic means of said eyepiece.

8. The optical apparatus as claimed in claim 7, wherein said additional optical means comprises a beam-splitting plate.

9. The optical apparatus as claimed in claim 7, wherein said additional optical means comprises a beam-splitting cube associated with said transmitter and receiver means.

10. The optical apparatus as claimed in claim 7, wherein said transmitter and receiver means are offset with respect to each other by 90°.

11. The optical apparatus as claimed in claim 7, wherein said transmitter and receiver means are arranged parallel to each other and said additional optical means is arranged between said transmitter and receiver means and said eyepiece optical means.

12. The optical apparatus as claimed in claim 7, wherein said additional optical means comprises a prism combination including a pentaprism and a parallelogram-shaped prism.

13. The optical apparatus as claimed in claim 7, where said additional optical means comprises a combination of a beam-splitting cube and target-marking projector means.

14. An apparatus according to claim 5 wherein said flap means are made from a material selected from the group consisting of rubber and synthetic flexible materials.

* * * * *